(12) United States Patent
Hansen et al.

(10) Patent No.: US 7,862,330 B2
(45) Date of Patent: Jan. 4, 2011

(54) ANGLED FILL PORTS AND SEAL-OFF ARRANGEMENT FOR PATTY-FORMING APPARATUS

(75) Inventors: David Hansen, Orland Park, IL (US); Scott A. Lindee, Mokena, IL (US)

(73) Assignee: Formax, Inc., Mokena, IL (US)

( * ) Notice: Subject to any disclaimer, the term of this patent is extended or adjusted under 35 U.S.C. 154(b) by 1289 days.

(21) Appl. No.: 11/408,248

(22) Filed: Apr. 20, 2006

(65) Prior Publication Data
US 2007/0098862 A1     May 3, 2007

Related U.S. Application Data

(60) Provisional application No. 60/674,007, filed on Apr. 22, 2005.

(51) Int. Cl.
A22C 7/00     (2006.01)
B29C 45/00     (2006.01)

(52) U.S. Cl. .................. 425/573; 426/513; 425/562

(58) Field of Classification Search .......... 425/572, 425/556, 573, 562; 426/512, 513; A22C 7/00
See application file for complete search history.

(56) References Cited

U.S. PATENT DOCUMENTS

| | | | |
|---|---|---|---|
| 3,887,964 A | 6/1975 | Richards | |
| 4,054,967 A | 10/1977 | Sandberg et al. | |
| 4,182,003 A | 1/1980 | Lamartino et al. | |
| 4,356,595 A | 11/1982 | Sandberg | |
| 4,372,008 A | 2/1983 | Sandberg | |
| 4,608,731 A | 9/1986 | Holly | |
| 4,821,376 A | 4/1989 | Sandberg | |
| 4,872,241 A * | 10/1989 | Lindee | 425/573 |

* cited by examiner

*Primary Examiner*—Maria Veronica D Ewald
(74) *Attorney, Agent, or Firm*—Erickson Law Group, PC

(57) ABSTRACT

A food patty molding machine has a reciprocating mold plate. A moldable food product is pumped through a fill passage into cavities of the mold plate when the mold plate is in its fill position. A fill plate, interposed in the fill passage immediately adjacent the mold plate, has a multiplicity of fill orifices distributed in a predetermined pattern throughout an area aligned with the mold cavity when the mold plate is in its fill position. The fill orifices define paths through the fill plate, wherein the paths each have an inlet portion that is perpendicular to a fill side face of the mold plate that is connected to an outlet portion that is obliquely angled to a fill side face of the mold plate. A seal-off stripper plate is interposed in the fill passage immediately adjacent the face of the fill plate opposite the mold plate. The stripper plate is movable along a path transverse to the mold plate path between a fill location and a discharge location. The stripper plate has a multiplicity of fill openings aligned one-for-one with the fill orifices as extensions thereof when the stripper plate is in its fill location.

20 Claims, 7 Drawing Sheets

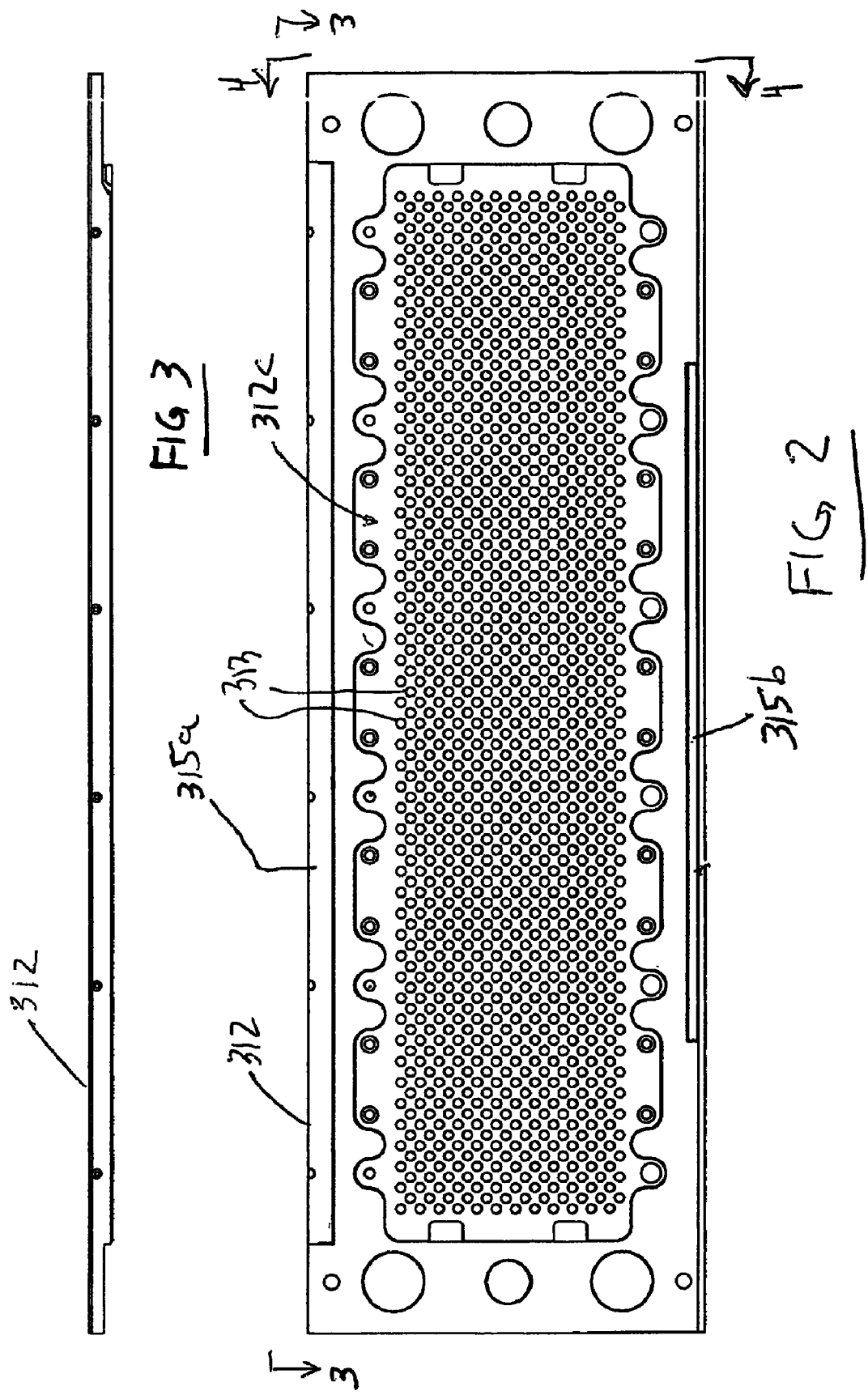

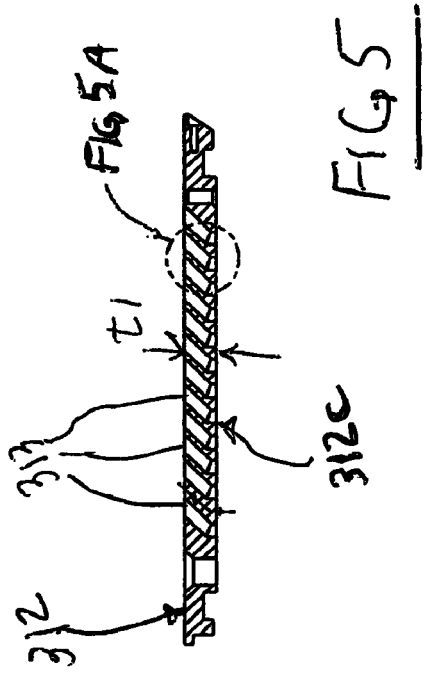
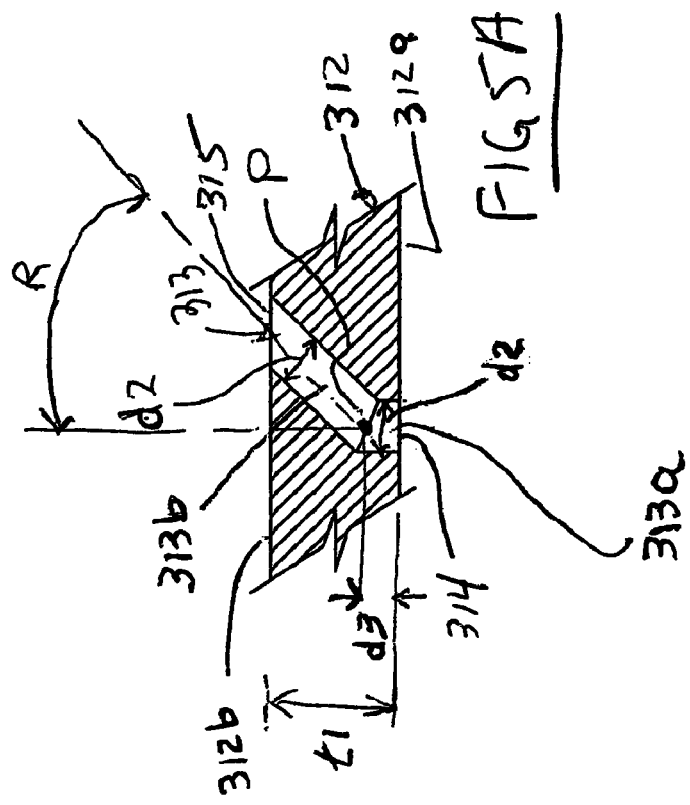

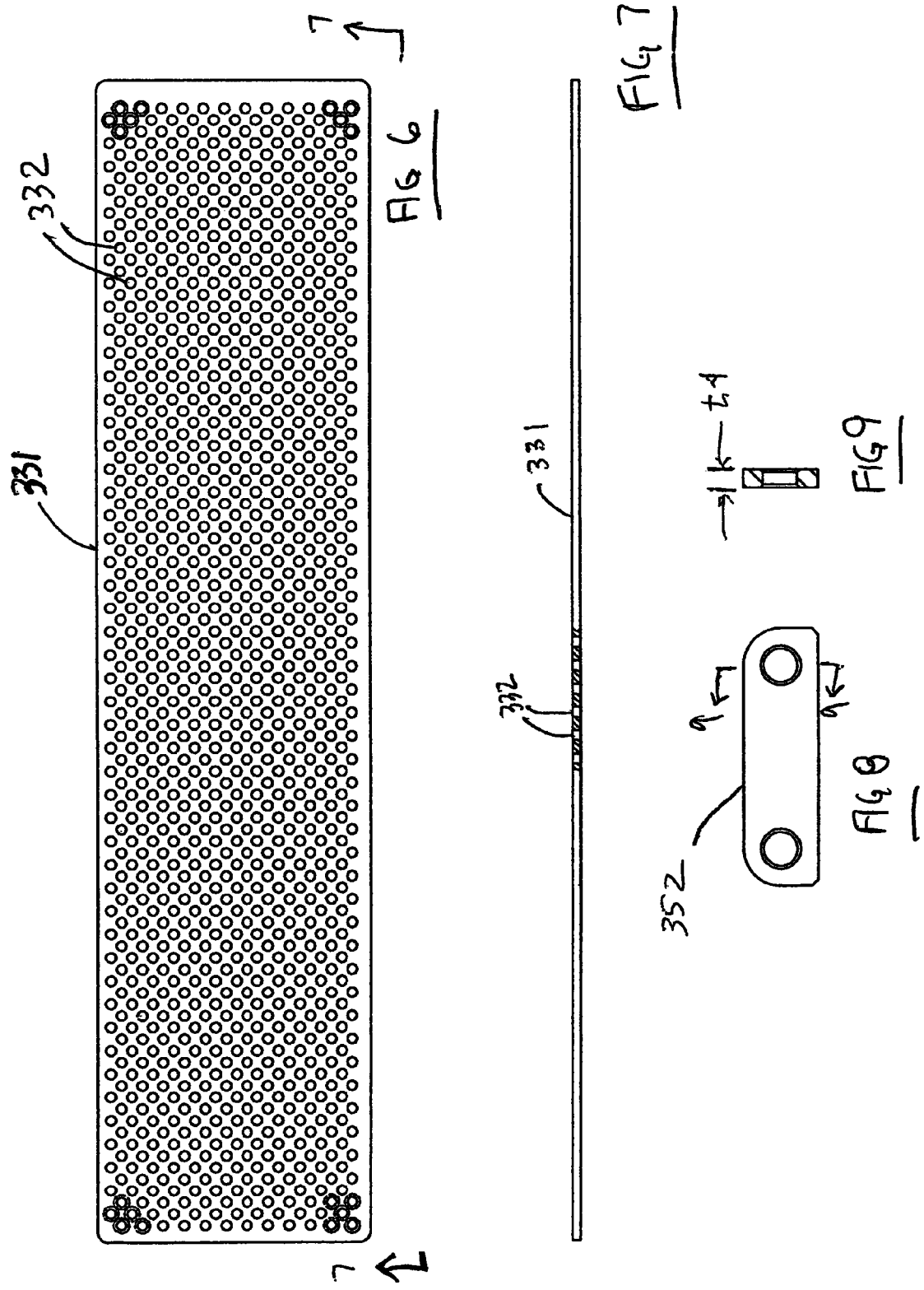

(FILL)

(SEAL-OFF)

ANGLED FILL PORTS AND SEAL-OFF ARRANGEMENT FOR PATTY-FORMING APPARATUS

This application claims the benefit of U.S. Provisional Application Ser. No. 60/674,007 filed Apr. 22, 2005.

BACKGROUND OF THE INVENTION

Food patties of various kinds, including hamburgers, molded "steaks", fish cakes, chicken patties, pork patties, potato patties, and others, are frequently formed in high-volume automated molding machines. Patty molding machines are described in U.S. Pat. Nos. 3,887,964; 4,054,967, and 4,182,003.

An apparatus for molding food patties that have essentially uniform texture and minimal shrinkage when cooked is disclosed in Sandberg et al., U.S. Pat. No. 4,356,595. The patties also hold their shape consistently after cooking. The apparatus includes a multi-orifice plate interposed in the outlet end of a fill passage extending from a food pump to a cyclically reciprocating mold plate. The food pump is preferably controlled so that the maximum fill pressure, desirable for consistent filling of the mold cavities, is used for only a limited part of each mold plate cycle.

A food product such as coarse ground beef tends to create an excessive buildup of fibrous material at the entrances of the orifices, requiring an excessive pumping pressure to operate the patty molding machine at high speeds. That buildup problem is effectively solved in the molding apparatus described in Sandberg U.S. Pat. No. 4,372,008, using a stripper plate slidably mounted immediately adjacent the fill plate. The stripper plate has fill openings that align one-for-one with the fill plate orifices when the stripper plate is in a fill location. Once the mold cavities are filled, the stripper plate slides transversely of the direction of mold plate movement to cut food fibers along the fill side face of the fill plate.

U.S. Pat. Nos. 4,356,595, and 4,372,008, describe food patty forming apparatus wherein the food material is forced through the multi-orifice plate into the mold to form a patty in which the food material defines interstitial voids for entrapping air and providing retention of cooking juices to promote more rapid and uniform cooking of the patty. Each of the orifices defined in the multi-orifice plate are of circular cross section, and each define, for at least part of the thickness of the multi-orifice plate, a cylindrical bore within the multi-orifice plate. The bores are each oriented with the bore longitudinal axis perpendicular to the planar surfaces of the multi-orifice plate and perpendicular to the plane of the fill side face of the patty mold plate.

A patty formed from food material forced through such a multi-orifice plate can have increased void space for trapping air and retaining cooking juices. However, if the discrete extrudate masses of food material in the patty are not also sufficiently cohesive or interlocked, there is a tendency for the patty to break or fall apart when subjected to handling or processing.

U.S. Pat. No. 4,608,731 describes an apparatus that includes a multi-orifice fill plate having a plurality of orifices therein which establish communication between an upstream side of the multi-orifice fill plate and a mold opening defined by suitable mold parts on the downstream side of the multi-orifice fill plate. At least some of the orifices each have at least a portion of the orifice that is adjacent the mold opening oriented so as to discharge food material into the mold opening in a direction that is oblique to the plane of the mold opening (i.e., the plane of the fill side face of the mold plate).

As described in U.S. Pat. No. 4,608,731, the orifices may be all generally oblique cylinders which are parallel and angled in the same direction. As pressure is continuously applied, and as the mold opening is filled, the extrudate masses of material accumulate, and it is possible for many of the masses to also be packed together in a somewhat shingled, as well as interwoven, fashion.

According to U.S. Pat. No. 4,608,731, an agitator bar is provided with means for relative movement between the bar and the multi-orifice fill plate in the direction along the fill side face of the multi-orifice fill plate so as to dislodge tissue fibers that span orifices and plug orifices.

Molding machines using wide-area fill passages with multi-orifice fill plates have had one distinct disadvantage; there has been no convenient and effective way to maintain a seal-off of the mold cavity and feed passage throughout the mold plate cycle. Thus, as the mold plate moves out toward its discharge (knockout) position, there is a portion of the cycle time when continuous paths are open from the feed passage, through some of the stripper plate fill openings and feed plate fill orifices, and through the mold cavity, to the space outside of the molding station. Even if these paths are quite small, the results are highly undesirable; waste of the food product, distortion of the patties, reduced sanitary conditions, and reduced pumping efficiency can all occur.

U.S. Pat. No. 4,821,376 describes a food patty molding machine that comprises a multi-orifice fill plate, interposed in the fill passage immediately adjacent the mold plate. The multi-orifice fill plate has a multiplicity of fill orifices distributed in a predetermined pattern throughout an area aligned with the mold cavity when the mold plate is in its fill position. A stripper plate is interposed in the fill passage immediately adjacent the side of the orifice plate opposite the mold plate, and movable along a path transverse to the mold plate path between a fill location and a discharge location. The stripper plate has a multiplicity of fill openings aligned one-for-one with the fill orifices as extensions thereof when the stripper plate is in its fill location. Stripper plate drive means, synchronized with the mold plate drive means, moves the stripper plate between its fill location and its discharge location.

The spacings between fill openings in the stripper plate, in the direction of the stripper plate path, are such that movement of the stripper plate to its discharge location seals off the fill orifices. The stripper plate drive means moves the stripper plate to its discharge location, in each mold cycle, before the mold cavity moves appreciably away from its fill position toward its discharge position, and then the stripper plate drive means maintains the stripper plate in its discharge location while the mold plate moves toward its discharge position, at least until the mold cavity is displaced beyond the fill orifices.

Each of the orifices defined in the multi-orifice plate are of circular cross section, and each define, for at least part of the thickness of the multi-orifice plate member, a cylindrical bore within the multi-orifice plate member. The bores are each oriented with the bore longitudinal axis perpendicular to the planar surfaces of the multi-orifice plate member and perpendicular to the plane of the patty mold cavity opening.

Accordingly, the present inventors have recognized that it would be desirable to provide a patty with the desired void structure and a structural capability for resisting breakage and internal separation. Particularly, the present inventors have recognized that it would also be desirable to provide an improved method and apparatus for making such an improved patty.

The present inventors have recognized that it would be desirable to provide to the method and apparatus the advantages of a seal off stripper plate.

SUMMARY OF THE INVENTION

An improved method and apparatus for producing a food patty is disclosed. The resulting patty has less of a tendency to break apart before and after cooking.

A new and improved cyclic food patty molding machine of the reciprocating mold plate type effectively eliminates or minimizes the problems and difficulties described above and that permits the molding of food products through a large area, multi-orifice fill passage while maintaining effective seal-off of the fill passage throughout the mold plate cycle.

A food patty molding machine is provided, having a mold plate having at least one mold cavity therein. A mold plate drive means is connected to the mold plate for driving the mold plate along a given path, in a repetitive cycle, between a fill position and a discharge position. A food pump means is provided for pumping a moldable food product through a fill passage connecting the food pump to the mold cavity when the mold plate is in its fill position. A fill plate, interposed in the fill passage immediately adjacent the mold plate, has a multiplicity of fill orifices distributed in a predetermined pattern throughout an area aligned with the mold cavity when the mold plate is in its fill position. The fill orifices define paths through the fill plate, wherein some of the paths each have a path portion that is obliquely angled to a fill side face of the mold plate.

A stripper plate is interposed in the fill passage immediately adjacent the face of the fill plate opposite the mold plate. The stripper plate is movable along a path transverse to the mold plate path between a fill location and a discharge location. The stripper plate has a multiplicity of fill openings aligned one-for-one with the fill orifices as extensions thereof when the stripper plate is in its fill location. A stripper plate drive means is synchronized with the mold plate drive means, for moving the stripper plate between its fill location and its discharge location. The spacing between fill openings in the stripper plate, in the direction of the stripper plate path, is such that movement of the stripper plate to its discharge location seals off the fill openings. The stripper plate drive means moves the stripper plate to its discharge location, in each mold cycle, before the mold cavity moves appreciably away from its fill position toward its discharge position. The stripper plate drive means maintains the stripper plate in its discharge location while the mold plate moves toward its discharge position at least until the mold cavity is displaced beyond the fill orifices.

Preferably, the path portions are angled from the fill passage toward a front of the apparatus. Alternately, the path portions can be angled from the fill passage toward the rear or toward a side of the apparatus.

Preferably, some of the paths include an inlet portion perpendicular to a fill side face of the fill plate and an outlet portion oblique to an outlet side face of the fill plate, the inlet portion in fluid communication with the outlet portion. Preferably, greater than 50% of the paths include the perpendicular inlet portions and the oblique outlet portions. In one embodiment all of the paths include the perpendicular inlet portions and the oblique outlet portions.

Preferably, all the oblique outlet portions are parallel.

Preferably, some of the paths include an inlet portion and an outlet portion, the inlet portion and the outlet portion being in fluid communication, wherein the inlet and outlet portions are oriented at an obtuse angle therebetween.

Numerous other advantages and features of the present invention will be become readily apparent from the following detailed description of the invention and the embodiments thereof, from the claims and from the accompanying drawings.

BRIEF DESCRIPTION OF THE DRAWINGS

FIG. 2 is a bottom view of a fill plate of the present invention;

FIG. 3 is an end view of the fill plate taken along line 3-3 of FIG. 2;

FIG. 4 is a side view of the fill plate taken along line 44 of FIG. 2;

FIG. 5 is a sectional view taken generally along line 5-5 of FIG. 3;

FIG. 5A is an enlarged view taken from FIG. 4;

FIG. 6 is a plan view of a seal-off, stripper plate according to the invention;

FIG. 7 is an end view of the seal-off, stripper plate taken along line 7-7 of FIG. 6;

FIG. 8 is a plan view of a spacer from FIGS. 1A and 10A;

FIG. 9 is a sectional view taken generally along line 9-9 of FIG. 8;

DESCRIPTION OF THE PREFERRED EMBODIMENT

Figure 1:
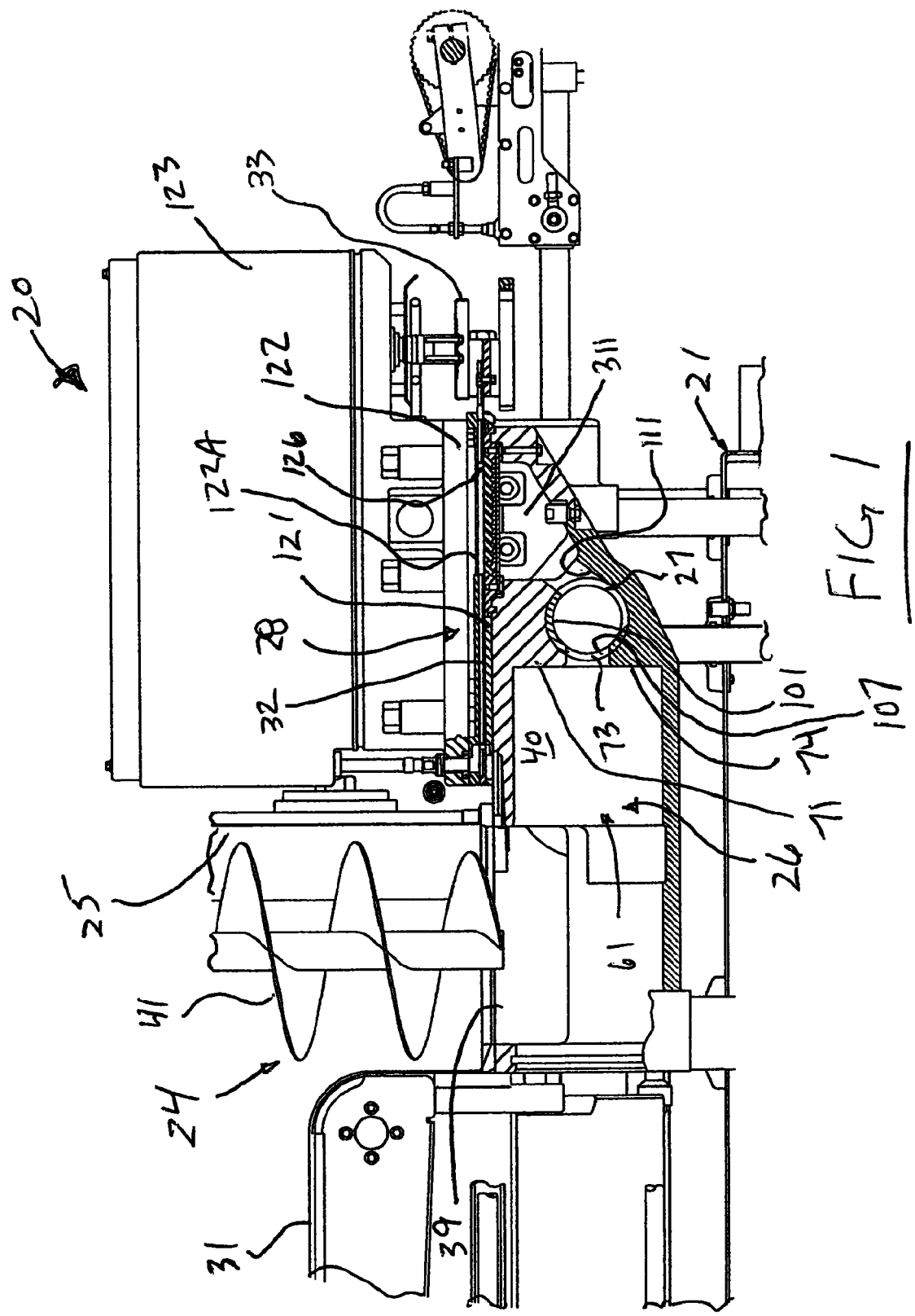
FIG. 1 is a fragmentary sectional view of a patty forming apparatus incorporating the present invention.

While this invention is susceptible of embodiment in many different forms, there is shown in the drawings and will herein be described in detail preferred features of the invention. It will be understood, however, that the present disclosure is to be considered as an exemplification of the principles of the invention and is not intended to limit the invention to the specific form of the combination of features that are illustrated and described.

FIG. 1 illustrates a high volume food patty molding machine 20 of the type described in detail in U.S. Ser. No. 10/942,627 filed Sep. 16, 2004, or Richards U.S. Pat. No. 3,887,964, both herein incorporated by reference. The food patty-forming apparatus can be generally configured as a FORMAX F-6, F-12, F-19, F-26, F-400 or MAXUM700 reciprocating mold plate forming machine, available from Formax, Inc. of Mokena, Ill., U.S.A.

Molding machine 20 includes a machine base 21 which supports the operating mechanisms of the machine and contains hydraulic actuating systems, electrical actuating systems, and most of the machine controls.

The food patty molding machine 20 includes a supply means 24 for storing and supplying a moldable food product, such as ground beef, fish, pork, chicken, potatoes, or the like, to the processing mechanisms of the machine. Supply means 24 includes a large food product storage hopper 25 that supplies food product to a food pump system 26. System 26 includes two food pumps (one shown) operating in alternation; other machines typically include only a single food pump. The two food pumps continuously pump food, under pressure, into a valve manifold 27 connected to a cyclically operable molding station 28. Molding station 28 includes a multi-cavity mold plate 32 that moves cyclically between a fill position, shown in FIG. 1 and a discharge position in which its mold cavities are outside of station 28, aligned with a set of knock-out cups 33.

Food supply means 24 includes a conveyor belt 31 that extends completely across the bottom of hopper 25. The forward end of hopper 25 communicates with a vertical hopper outlet 39 that leads downwardly into two pump chambers; only one pump chamber 40 is shown. One or more feed screws 41 are driven in rotation to deliver food product from the outlet 39 to the pump chamber 40. The conveyor belt 31 is driven in circulation to deliver food product in the hopper 25 to the feed screw 41.

In machine 20, as noted above, the food pump system 26 comprises two reciprocating food pumps; only one pump 61 is illustrated. Food pump 61 includes a hydraulic cylinder (not shown). The piston in the cylinder is connected to a piston rod that is in turn connected to a large pump plunger (not shown). Plunger is aligned with and extends into pump cavity 40, which is enclosed by a housing 71. The forward wall 74 of pump cavity 40 includes a slot 73 that communicates with the pump manifold 27.

Pump feed manifold 27 includes a valve cylinder 101 fitted into an opening in housing 71 immediately beyond wall 74. Valve cylinder 101, as shown in FIG. 2, includes two intake slots; only one intake slot 107 is illustrated. Slot 107 is alignable with the outlet slot 73 in pump cavity wall 74, and this is the position employed when pump 61 is in use. Rotation of cylinder 101 is effective to move slot 107 out of alignment with slot 73 when the other pump of machine 20 is in operation. Valve cylinder 101 also includes an elongated outlet slot aligned with a slot 111 in housing 71 that comprises a fill passage for the molding mechanism of station 28.

Figure 1A:
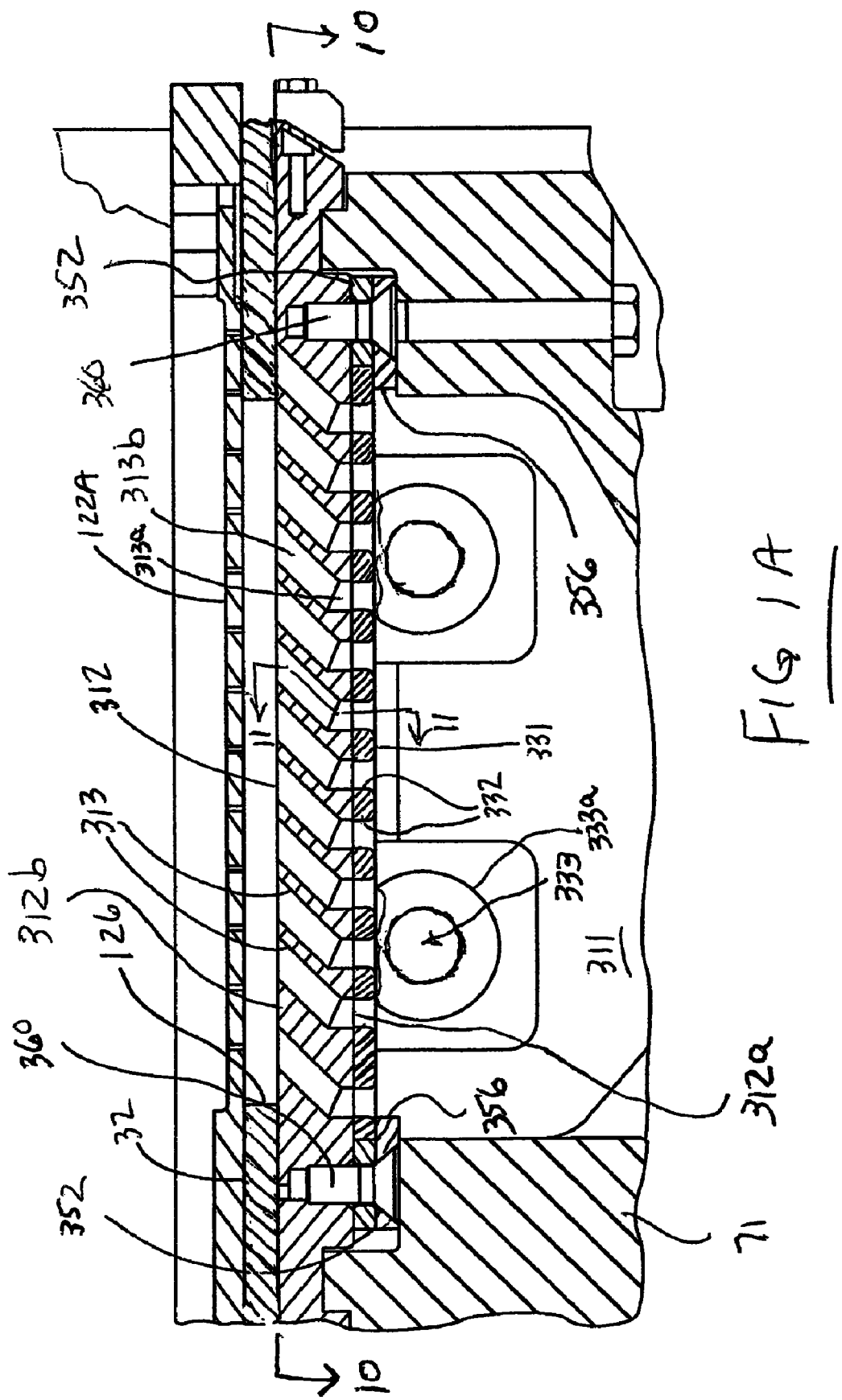
FIG. 1A is an enlarged view taken from FIG. 1.

As seen in FIGS. 1 and 1A, the upper part of the pump housing 71 comprises a plate 121 that supports the mold plate 32. Mold plate 32 includes a plurality of individual mold cavities 126 distributed across the width of the mold plate; mold cavities 126 are alignable with the manifold outlet, fill passage 311, as shown in FIGS. 1 and 1A. A mold cover 122 is disposed immediately above mold plate 32, closing off the top of each of the mold cavities 126. Mold cover 122 may include a conventional breather plate 122A; see FIG. 1A. Suitable spacers (not shown) are provided to maintain the spacing between cover 122 and support plate 121 essentially equal to thickness of mold plate 32. A housing 123 is positioned above cover plate 122, FIG. 1. Housing 123 encloses the operating mechanism (not shown) for knock-out cups 33.

In the operation of patty molding machine 20, a supply of ground meat or other moldable food product is put into hopper 25, and is advanced toward hopper outlet 39 by conveyor 31. Whenever one of the food pump plungers is retracted to expose a pump cavity (e.g., cavity 40), the vertical feed screws 41 aligned with that pump cavity are actuated to feed the food product into the pump cavity.

In FIG. 1 pumping system 26 is illustrated with mold plate 32 in its fill position and with pump 61 ready to pump the moldable food product through manifold 27. The second food pump of the machine, at this time, may be receiving a supply of the food product for a subsequent pumping operation. The plunger (not shown) of pump 61 will begin its pumping stroke, and will compress the food product in pump cavity 40, forcing it under pressure into manifold 27. As operation of machine 20 continues, the plunger advances and food product flows into mold cavities 126.

Ultimately, when pump cavity 40 is nearly empty, valve cylinder 101 is rotated to connect its intake to the outlet of the second food pump (not shown) and to shut off its intake from pump chamber 40. Thereafter, the second food pump is maintained in operation. The plunger of food pump 61 (FIG. 1) is then retracted, by means of the cylinder and the piston, to allow for refilling of pump cavity 40 with food product. Subsequently, when the second food pump requires refilling, a corresponding changeover back to pump 61 occurs. In this manner, overlapping alternating operation of the two food pumps continues as long as molding machine 20 is in operation. Each time a pump changeover occurs, it is preceded by a rotation of valve cylinder 101 of manifold 27 to bring the new pump into operation before the refill cycle for the pump that has been in use is initiated.

In describing the operation of molding mechanism 28, and particularly mold plate 32, it is convenient to start with mold plate 32 in the fill position shown in FIG. 1. In each molding cycle, mold plate 32 remains in this fill position for a limited dwell interval. As the mold cavities 126 moves into the fill position, one of the two food pumps of machine 20 pumps food product through manifold 27 and fill passage 311, filling the mold cavities. To assure complete filling of the mold cavities, the food pump must apply a substantial pressure to the food product.

Following the fill dwell interval, mold plate 32 is moved outwardly, to the right from its fill position, as shown in FIG. 1, until it reaches a discharge position with its mold cavities 126 aligned with knockout cups 33. A second dwell interval occurs at the discharge position of mold plate 32, during which knockout cups 33 move downwardly through the mold cavities, discharging the molded food patties onto a takeoff conveyor (not shown).

Following discharge of the molded food patties, mold plate 32 is moved back toward its fill position so that mold cavities 126 can again be filled with food product. In this manner, food patties are molded at a rapid pace by machine 20. The commercial version of machine 20 can operate at a rate of greater than ninety molding cycles per minute. Inasmuch as there may be as many as six or more mold cavities in mold plate 32, it is seen that the output rate for machine 20 may be in excess of five hundred food patties per minute.

The fill passage 311 of the molding mechanism is immediately adjacent mold plate 32. The fill passage 311 encompasses substantially the entire surface area of all of the mold cavities 126. A fill plate 312 is interposed in the outlet end of fill passage 311, immediately adjacent mold plate 32. The fill plate 312 has an inlet face 312a and an outlet face 312b. A multiplicity of fill orifices 313 are distributed, preferably in staggered rows, throughout substantially the entire surface area of fill plate 312. Orifices 313, with inlets 314 and outlets 315, are distributed throughout the superimposed surface area of each of the mold cavities 126; see FIG. 10. Additional orifices may be provided outside the superimposed area of the cavities but these orifices will not be effective to fill cavities.

The fill plate includes keys 315a, 315b that lock into the housing 71 to add to the structural rigidity of the assembly.

According to the preferred embodiment the orifices 313 each comprise a path through the fill plate wherein the path includes an inlet portion 313a that is perpendicular to the fill side face of the fill plate and an outlet portion 313b that is oblique to the outlet face 312b of the fill plate, inclined toward a front of the apparatus (i.e. inclined upwardly toward the discharge position of the mold plate).

Alternately, the outlet portion 313b can be inclined toward a rear or side of the apparatus.

According to the preferred embodiment as illustrated in FIG. 5A, the fill plate 312 has a thickness "t1" through a central orifice-containing portion 312c (FIG. 2), that preferably is about 0.54 inches thick. The inlet portion is substantially vertical. The inlet portion has a diameter "d1" that is preferably about 0.25 inches. The outlet portion has a diameter of "d2" that is preferably about 0.25 inches and is inclined at an angle "R" of about 45° from the axis of the inlet portion. The centerline intersection point "P" between the inlet and outlet portions occurs at a depth "d3" beneath the outlet face 312b of the fill plate, preferably about 0.47 inches.

Figure 10:
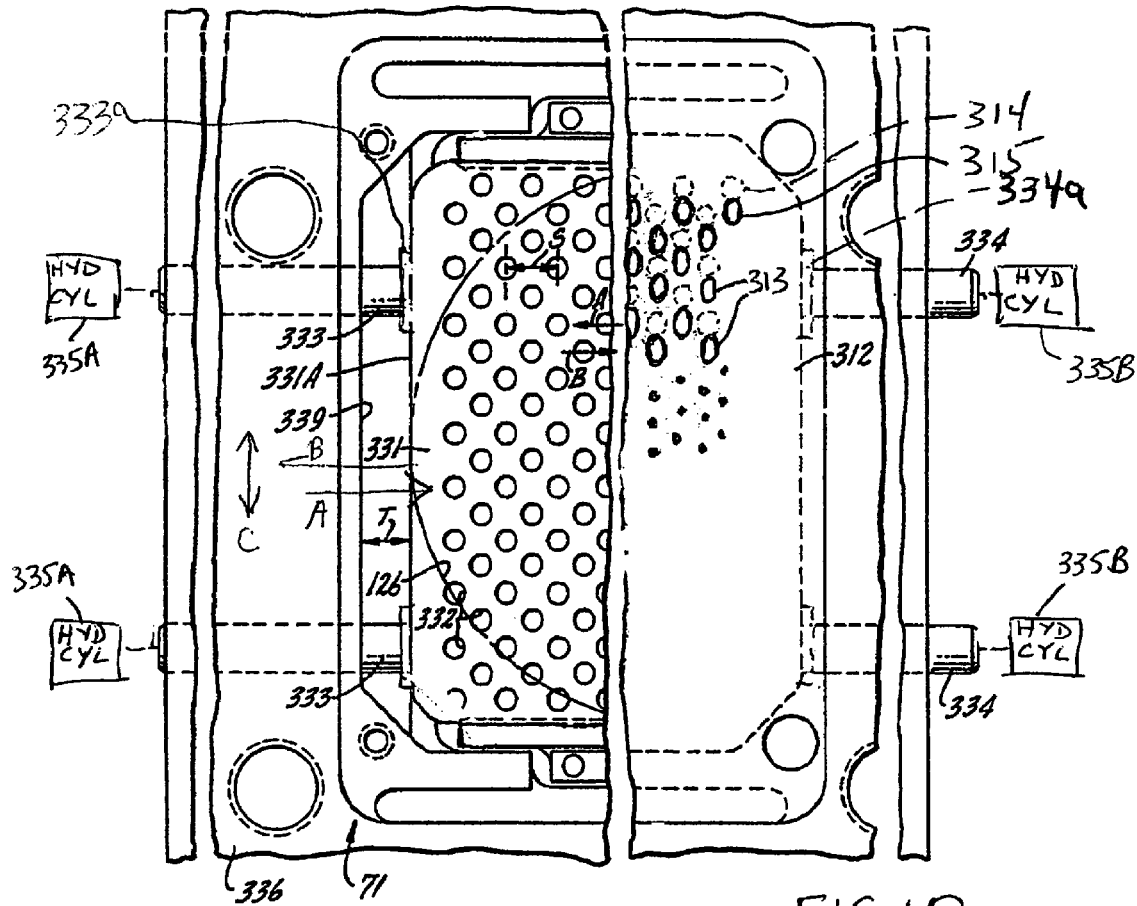
FIG. 10 is a fragmentary sectional view of the fill passage taken approximately along line 10-10 in FIG. 1A, broken away to show a part of the stripper plate.

Because the outlet portions are inclined to the outlet face 312b of the fill plate 312 the outlets 315 appear as elongated ellipses in FIG. 10. For simplicity, not all of the orifices 313 are shown in FIG. 10. However it is preferred that the number of orifices 313 corresponds to the number of fill openings 332.

Figure 11:
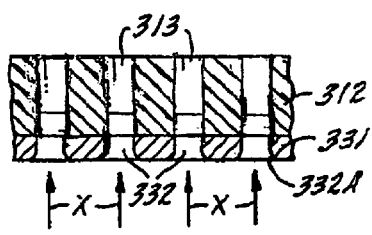
FIGS. 11 and 12 are detailed sectional views, taken approximately as indicated by lines 11-11 in FIG. 1A, illustrating the stripper plate in a fill and seal-off position, respectively.

A stripper plate 331 is slidably mounted in fill passage 311 immediately adjacent the face of fill plate 312 opposite mold plate 32, as shown in FIG. 1A. In fact, stripper plate 331 is disposed in surface-to-surface contact with fill plate 312. Stripper plate 331 includes the multiplicity of fill openings 332 distributed throughout substantially its entire surface area and aligned one-for-one with fill orifices 313, so that each fill orifice 313 is an extension of one fill opening 332 when stripper plate 331 is in its fill location as shown in FIG. 11. Fill orifices 313 and fill openings 332 may be aligned in parallel rows with equal center-to-center spaces between the orifices (and fill openings) in the direction of the orifice rows. The edges 332A of fill openings 332 that face toward food passage 311 are rounded to minimize food product buildup; see FIG. 11.

The stripper plate has a thickness "t2", preferably about 0.18 inches and the fill openings 332 have a diameter "d4", preferably about 0.24 inches. The opening 332 has inlet side radiused to allow for smooth filling. A preferred radius is about 0.05 inches. The outlet sides of the stripper plate openings 332 have sharp edges, more useful for stripping action of the stripper plate.

FIGS. 1A-10 show the construction for fill plate 312 and stripper plate 331 as utilized in the present invention. Each side of stripper plate 331 has two push rods 333 that abut the stripper plate, the rods 333 at the left-hand side of the stripper plate and the rods 334 at the right-hand side of that plate (FIG. 10). The rods 333, 334 include disk shaped heads 333a, 334a that abut the stripper plate. The heads allow for an eccentric arrangement of the rods with regard to the stripper plate (See FIG. 1A). Rods 333 extend through the side wall 336 of housing 71 and are connected to a drive mechanism, preferably one or more hydraulic cylinders as indicated schematically at 335A. A similar construction is provided at the opposite end of plate 331, with cylinders 335B. When one set of cylinders (335A or 335B) are pressurized to extend the rods to drive the plate, the respective other set (335A or 335B) are switched to bleed hydraulic oil to tank as the cylinder rods are retracted.

This arrangement affords a stripper plate drive means for sliding stripper plate 331 back and forth in the directions indicated by the arrows A and B, FIG. 10. Arrows A and B are transverse to the direction of mold plate travel, arrow C. In FIG. 10, stripper plate 331 is shown at the right-hand limit of its travel; at the opposite extreme, the left-hand edge 331A of the stripper plate engages a surface 339 that is a part of housing 71. The total travel of stripper plate 331 is a distance "T", equal to the center-to-center orifice spacing S.

Figure 10A:
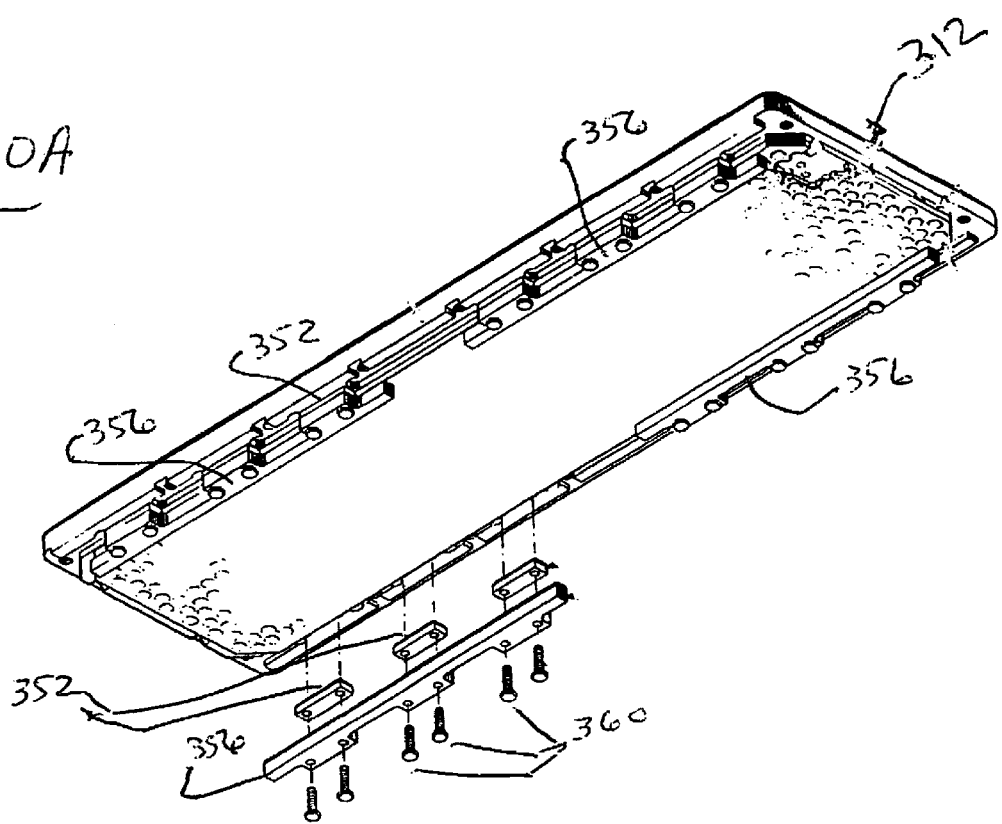
FIG. 10A is a bottom, perspective, exploded view of an assembly of fill plate and stripper plate.

FIG. 1A and 10A illustrate the stripper plate 331 is slidably held below the fill plate 312 by a plurality of spacers 352 and a plurality of bracket bars 356. The spacers 352 have a thickness "t4" that is slightly greater than the thickness "t3" of the stripper plate 331, preferably by about 0.002 inches.

A plurality of fasteners 360 mount the spacers 352 and bars 356 to the fill plate 312 and hold the stripper plate 331 slidingly thereto.

The overall construction illustrated in FIGS. 1A-10 has been found to be highly advantageous in the formation of hamburger patties and other molded food patties in several respects. With this multiple-orifice full area fill passage arrangement, food product leaving the outlets 315 of orifices 313 expands within each mold cavity 126, filling the mold cavity completely. The food product flows only a short distance into the mold cavity and expands from a series of locations immediately adjacent the orifice outlets instead of from one location. The result is an improvement in the texture of the molded food patties; the texture is more like that of a hand-molded food patty than is realized with the conventional construction described above in connection with FIG. 1. Furthermore, the food patties tend to shrink less and hold their shape more consistently when cooked.

Because each orifice includes the inlet portion being perpendicular, the inlets 313 appear as circles on the fill side face of the fill plate and can be precisely registered with the cylindrical fill openings 332 of the stripper plate 331. A seal off can be achieved between the stripper plate and the fill plate. At the same time, because the outlet portions are inclined, the advantages attributed to inclined orifices regarding patty structure can be achieved.

As described in the aforementioned Sandberg et al U.S. Pat. No. 4,356,595 and Sandberg U.S. Pat. No. 4,372,008, the quality of the molded food patties can be improved in some cases by relieving the pressure on the food product in the pump cavity and in the fill passage throughout a substantial portion of the molding cycle. Specifically, quality of the molded food patties may be materially improved if the pressure is relieved substantially during the time interval in which the mold plate is moving away from its fill position but a part of the mold cavity remains in communication with the fill passage.

Figure 12:
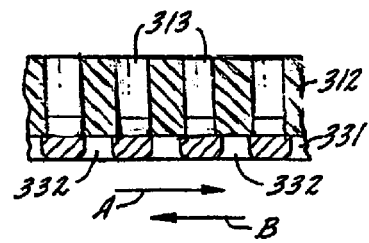

The operation of stripper plate 331 can best be understood by reference to FIGS. 11 and 12. FIG. 11 shows the alignment of the stripper plate with fill plate 312 during the fill dwell interval. It is the same alignment shown in FIG. 1A. This position is maintained throughout the fill dwell interval, with food product being pumped under pressure through fill openings 332 and orifices 313 (arrows X) and on into the mold cavities. During this interval relatively long fibers present in the food product may catch on the edges 332A of the stripper plate fill openings 332.

After the end of the fill dwell, with the mold cavities filled and the mold plate beginning its movement toward its discharge position (arrow C in FIG. 10), stripper plate 331 is shifted through a distance equal to one-half the distance T (FIG. 10) to its discharge or seal-off location. FIG. 12 shows the stripper plate at its discharge location; the direction of movement is in the direction of the arrow A, FIGS. 10 and 12. When that movement is later resumed and completed, again in the direction of arrow A for a distance T/2, stripper plate 331 is again positioned in a fill location with its fill openings 332 aligned one-for-one with the orifices 313, the same alignment shown in FIGS. 1A and 11. Movement of the stripper plate, however, has severed any long food fibers hung up on the stripper plate and has re-positioned the fibers in alignment with fill openings 332. When movement of the ground meat or other food product commences in the fill dwell interval of the next mold plate cycle, the re-positioned fibers pass through the fill openings 332 and orifices 313 into the mold cavities.

During this fill dwell, additional fibers may accumulate on the edges of the fill openings in stripper plate 331. Those fibers are re-positioned, and severed if long enough, when the stripper plate slides back to its discharge location and then to its original fill position, in the direction of arrow B (FIGS. 10 and 12) later in the next mold plate cycle. Thus, when the return movement of stripper plate 331 is completed, the fibers are again aligned with the orifices and will be impelled into the mold cavities in the next fill dwell interval.

Maintenance of some fill pressure, forcing food product against the face of stripper plate 331 facing fill passage 311 is desirable during the sliding movements of the stripper plate because it prevents food product from working its way between the stripper and orifice plates. A preferred timing for the movement of stripper plate 331 can be understood from U.S. Pat. No. 4,821,376.

Thus, in each mold plate cycle stripper plate 331 first slides through the distance T/2 (T=S, FIG. 10), to start repositioning and severing fibers accumulating on the edges of the fill openings 332 and to seal off mold cavities 126 so that no food product can be pumped through the food cavities and out of mold station 28 while mold plate 32 is moving to its discharge position. While the mold plate is in its discharge dwell, the stripper preferably remains in its discharge/seal-off position so that when the mold plate moves back in to its fill position there is no interval when there is a complete open path from fill passage through the mold cavities to the outside of the molding station. Thus, continuing movement to a fill location for stripper plate 331 preferably occurs during an interval when mold cavities 126 are already fully enclosed within molding station 28. The buildup of food product at the inlet ends of orifices 313 is effectively precluded, despite the presence of substantial fiber content; the patty molding operation can be maintained at full speed.

In the foregoing description, stripper plate 331 has two fill locations, with just one discharge/seal-off location half way between. Alternatively, the molding machine may be set up for just one fill location, in which case the stripper plate moves a distance of approximately T/2 in one direction (e.g. arrow A) to its seal-off location, then back in the opposite direction (arrow B) later in the same mold plate cycle. The full displacement arrangement as described, with two fill locations, is somewhat better as regards severance and repositioning of long fibers, but the alternatives are equal with respect to effective seal-off of the food pump system.

From the foregoing, it will be understood that numerous variations and modifications may be effected without departing from the true spirit and scope of the novel concept of the invention. It is to be understood that no limitation with respect to the specific method, apparatus, and product illustrated herein is intended or should be inferred. It is, of course, intended to cover by the appended claims all such modifications as fall within the scope of the claims.

The invention claimed is:

1. A food patty molding machine, comprising:
a mold plate having at least one mold cavity therein;
mold plate drive for driving the mold plate along a given path, in a repetitive cycle, between a fill position and a discharge position;
food pump for pumping a moldable food product;
a fill passage connecting the food pump to the mold cavity when the mold plate is in its fill position;
a fill plate, interposed in the fill passage immediately adjacent the mold plate, having a multiplicity of fill orifices distributed in a predetermined pattern throughout an area aligned with the mold cavity when the mold plate is in its fill position, said fill orifices defining paths through said fill plate, wherein a plurality of said paths each have an outlet path portion that is obliquely angled to a face of said mold plate and an inlet path portion that is perpendicular to a face of said mold plate;
a stripper plate interposed in the fill passage immediately adjacent the side of the fill plate opposite the mold plate, and movable along a path transverse to the mold plate path between a fill location and a discharge location, the stripper plate having a multiplicity of fill openings aligned one-for-one with the fill orifices as extensions thereof when the stripper plate is in its fill location;
and stripper plate drive, synchronized with the mold plate drive, for moving the stripper plate between its fill location and its discharge location; and
wherein the spacings between fill openings in the stripper plate, in the direction of the stripper plate path, are such that movement of the stripper plate to its discharge location seals off the fill openings.

2. A food patty molding machine according to claim 1, in which the fill orifices are distributed in rows regularly spaced in the direction of mold plate movement by a spacing S and in which the distance the stripper plate moves, from its fill location to its discharge location, is S/2.

3. A food patty molding machine according to claim 2, in which the stripper plate has two fill locations spaced by a distance T such that T=S, and in which, in each mold plate cycle, the stripper plate moves from one fill location by a distance S/2, in a given direction along its path, to its discharge location, and subsequently moves a further distance S/2 in the same direction to its other fill location.

4. A food patty molding machine according to claim 3, in which, in each mold plate cycle, movement of the stripper plate from its one fill location to its discharge location occurs in a first interval that starts approximately when movement of the mold plate to its discharge position begins, and movement of the stripper plate from its discharge position to its other fill position starts when the mold plate approaches its fill position.

5. A food patty molding machine according to claim 1, wherein greater than 50% of said paths include said inlet path portions and said outlet path portions.

6. A food patty molding machine according to claim 5, wherein said outlet path portions are parallel.

7. A food patty molding machine according to claim 1, wherein said inlet path portion and said outlet path portion are in fluid communication, and wherein said inlet and outlet path portions are oriented at an obtuse angle.

8. A food patty molding machine according to claim 1, wherein said outlet path portions are angled from the fill passage toward a front of said apparatus.

9. A food patty molding machine according to claim 8, wherein said outlet path portions form ellipses on an outlet face of said fill plate.

10. A food patty molding machine according to claim 1, wherein said outlet path portions form ellipses on an outlet face of said fill plate.

11. A food patty molding machine according to claim 1,
wherein the stripper plate drive moves the stripper plate to its discharge location, in each mold cycle, before the mold cavity moves appreciably away from its fill position toward its discharge position; and
wherein the stripper plate drive maintains the stripper plate in its discharge location while the mold plate moves toward its discharge position at least until the mold cavity is displaced beyond the fill orifices.

12. Tooling for a food patty molding machine having a mold plate having at least one mold cavity therein, a mold plate drive for driving the mold plate along a given path, in a repetitive cycle, between a fill position and a discharge position, a food pump for pumping a moldable food product, a fill passage connecting the food pump to the mold cavity when the mold plate is in its fill position, comprising:

a fill plate, interposed in the fill passage immediately adjacent the mold plate, having a multiplicity of fill orifices distributed in a predetermined pattern throughout an area aligned with the mold cavity when the mold plate is in its fill position, said fill orifices defining paths through said fill plate, wherein a plurality of said paths each have an outlet path portion that is obliquely angled to a face of said fill plate and an inlet path portion that is perpendicular to a face of said fill plate.

13. Tooling according to claim 12, wherein the inlet path portion and the outlet path portion intersect at an inflection.

14. Tooling according to claim 12, wherein greater than 50% of said paths include said inlet path portions and said outlet path portions.

15. Tooling according to claim 14, wherein said inlet path portions and said outlet path portions are in fluid communication, and wherein said inlet and outlet portions are oriented at an obtuse angle.

16. Tooling according to claim 12, wherein said outlet path portions are angled from the fill passage toward an outlet face of said fill plate.

17. Tooling according to claim 12, wherein said outlet path portions form ellipses on an outlet face of said fill plate.

18. Tooling according to claim 12, wherein adjacent inlet path portions or adjacent outlet path portions are evenly spaced.

19. Tooling according to claim 12, wherein the inlet path portions are parallel.

20. Tooling according to claim 12, wherein the outlet path portions are parallel.

* * * * *